US010210026B2

(12) United States Patent
Guo-Boynton (10) Patent No.: US 10,210,026 B2
(45) Date of Patent: Feb. 19, 2019

(54) ENTERPRISE TOOLS ENHANCEMENTS (75) Inventor: Vivien Guo-Boynton, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 692 days.

(21) Appl. No.: 13/531,692

(22) Filed: Jun. 25, 2012

(65) Prior Publication Data
US 2013/0086151 A1 Apr. 4, 2013

Related U.S. Application Data (60) Provisional application No. 61/541,282, filed on Sep. 30, 2011.

(51) Int. Cl.
G06F 9/54 (2006.01)

(52) U.S. Cl.
CPC .......... *G06F 9/54* (2013.01); *G06F 2209/545* (2013.01)

(58) Field of Classification Search
CPC .... G06F 3/048; G06F 9/4443; G06F 9/45529; G06F 21/128; G06F 17/30905; G06F 21/31; G06F 2221/2119; G06F 17/30902; G06F 17/30893; H04L 41/046
See application file for complete search history.

(56) References Cited

U.S. PATENT DOCUMENTS 6,266,056 B1 * 7/2001 Kanungo ................ G06F 9/451
715/744
6,351,272 B1 * 2/2002 Kanungo ................ G06F 9/451
715/764
6,380,955 B1 * 4/2002 Kanungo ................ G06F 9/451
715/764

(Continued)

FOREIGN PATENT DOCUMENTS

CN 101996093 A 3/2011
CN 103827778 A 5/2014
(Continued)

OTHER PUBLICATIONS

International Search Report for PCT/US 12/57236 filed Sep. 26, 2012.

(Continued)

*Primary Examiner* — Vivek Srivastava
*Assistant Examiner* — Muhammad Raza
(74) *Attorney, Agent, or Firm* — Kilpatrick Townsend & Stockton LLP (57) ABSTRACT Embodiments of the invention provide systems and methods for managing an interface of an enterprise application to support unlimited modal and modeless elements thereof. More specifically, embodiments of the present invention can include an Application Program Interface (API) for invoking and interacting with a set of modal and/or modeless functions and which can be browser independent. Such an API can be implemented, for example, in JavaScript or other language supported by the browser. Generally speaking, this script or application can provide features such as normally associated with the browser's modal support but without relying on that support and without many of the constraints and other limitations normally imposed or encountered with the browser's modal support.

31 Claims, 7 Drawing Sheets

(56) References Cited

U.S. PATENT DOCUMENTS

| | | | |
|---|---|---|---|
| 6,407,759 B1* | 6/2002 | Kanungo | G06F 9/451 |
| | | | 715/809 |
| 6,842,772 B1 | 1/2005 | Delaney et al. | |
| 7,702,798 B2 | 4/2010 | Apreutesei et al. | |
| 7,869,425 B2 | 1/2011 | Elliott et al. | |
| 2002/0107907 A1* | 8/2002 | Case | H04L 63/083 |
| | | | 709/203 |
| 2003/0065739 A1* | 4/2003 | Shnier | G06F 17/30887 |
| | | | 709/217 |
| 2005/0108654 A1* | 5/2005 | Gopalraj | G06F 21/31 |
| | | | 715/791 |
| 2005/0203882 A1* | 9/2005 | Godley | G06F 17/30887 |
| 2005/0204047 A1* | 9/2005 | Mitchell | G06F 17/30902 |
| | | | 709/228 |
| 2006/0253799 A1* | 11/2006 | Montroy et al. | 715/809 |
| 2007/0250841 A1 | 10/2007 | Scahill et al. | |
| 2007/0256003 A1* | 11/2007 | Wagoner | G06F 17/3089 |
| | | | 715/205 |
| 2008/0104025 A1* | 5/2008 | Dharamshi | G06F 17/30896 |
| 2008/0189400 A1* | 8/2008 | Norrie | H04L 29/06 |
| | | | 709/223 |
| 2009/0049373 A1* | 2/2009 | Sharma | H04L 67/02 |
| | | | 715/234 |
| 2009/0198787 A1* | 8/2009 | Broda | G06F 17/30905 |
| | | | 709/209 |
| 2009/0216803 A1* | 8/2009 | Goldfarb | G06Q 40/08 |
| 2010/0070448 A1 | 3/2010 | Omoigui | |
| 2010/0077344 A1* | 3/2010 | Gaffney | G06F 3/0481 |
| | | | 715/788 |
| 2010/0115023 A1 | 5/2010 | Peled et al. | |
| 2010/0217837 A1 | 8/2010 | Ansari et al. | |
| 2010/0231790 A1 | 9/2010 | Ansari et al. | |
| 2010/0332989 A1* | 12/2010 | Havivi | G06F 3/0481 |
| | | | 715/733 |
| 2010/0332993 A1* | 12/2010 | Bousseton | G06Q 30/02 |
| | | | 715/738 |
| 2011/0161941 A1* | 6/2011 | Thomson et al. | 717/140 |
| 2011/0252302 A1* | 10/2011 | Yalovsky | G06F 17/30905 |
| | | | 715/234 |
| 2012/0102433 A1* | 4/2012 | Falkenburg | G06F 9/45529 |
| | | | 715/835 |
| 2012/0151361 A1* | 6/2012 | Burton | G06F 17/3089 |
| | | | 715/736 |
| 2012/0233241 A1* | 9/2012 | Dickens | G06F 17/30902 |
| | | | 709/203 |
| 2013/0073983 A1* | 3/2013 | Rasmussen | G06Q 30/02 |
| | | | 715/753 |
| 2013/0145314 A1* | 6/2013 | Dhar et al. | 715/803 |
| 2014/0304679 A1* | 10/2014 | Kishnani | G06F 8/33 |
| | | | 717/106 |

FOREIGN PATENT DOCUMENTS

| | | |
|---|---|---|
| CN | 103827778 B | 9/2017 |
| WO | 2013049134 A1 | 4/2013 |

OTHER PUBLICATIONS

Chinese Patent Application No. CN201280047502.9, "Office Action", dated Mar. 1, 2016, 17 pages.
Chinese Patent Application No. CN201280047502.9, "Office Action" dated Jun. 22, 2017, 9 pages.
CN201280047502.9, Office Action, dated Jan. 3, 2017, 6 pages.
EP 12837542.5 received an Office Action dated May 17, 2018, all pages.

* cited by examiner

ENTERPRISE TOOLS ENHANCEMENTS

CROSS-REFERENCES TO RELATED APPLICATIONS

The present application claims benefit under 35 USC 119(e) of U.S. Provisional Application No. 61/541,282, filed on Sep. 30, 2011 by Boynton and entitled "Enterprise Tools Enhancements," of which the entire disclosure is incorporated herein by reference for all purposes.

BACKGROUND OF THE INVENTION

Embodiments of the present invention relate generally to methods and systems for providing a user interface of an enterprise application and more particularly to managing an interface of an enterprise application to support unlimited modal and modeless elements thereof.

In a user interface, such as a web page presented through a browser application, a modal window is commonly understood to be a child window that is opened, for example in response to a click of an element or other action related to the parent window, and with which the user interacts, e.g., enters some data or takes some other action, before returning to the parent page or window. Such modal windows are used to direct or control a user's workflow, for example when filling a form or completing some other task. Popular browser applications provide means, for example through methods exposed in an Application Program Interface (API) of the browser application, for applications to use modal windows.

However, the methods provided by browser applications are limited and do not satisfy the needs of all applications. For example, enterprise applications which may support very elaborate and extensive workflows have a need to open a very large number of modal windows. Current implementations of modal functions do not support nested and multiple levels of windows. Another problem with current implementations of modal functions is that they do not support or consider position, size, or other layout or format definitions the application may have for the windows. For example, current modal windows cannot resize based on the content therein or span beyond the boundaries of a containing frame. Other limitations of current implementations of modal functions in browser application further limit their usefulness with some applications. Hence, there is a need for improved methods and systems for providing a user interface of an enterprise application.

BRIEF SUMMARY OF THE INVENTION

Embodiments of the invention provide systems and methods for managing an interface of an enterprise application to support unlimited modal and modeless elements thereof. According to one embodiment, a system can comprise an application server executing an enterprise application, the enterprise application maintaining and providing a set of application data, and a web server communicatively coupled with the application server. The web server can receive application data from the enterprise application of the application server, generate at least one user interface page based on the received application data, and provide the at least one user interface page. A client device can be communicatively coupled with the web server and can execute a client application. The client application can comprise a modal controller separate from a browser application of the client device and having an Application Program Interface (API) for invoking one or more functions of the modal controller. The functions of the modal controller can include, but are not limited to, one or more of generating one or more modal windows, assigning an identifier to each modal window generated, maintaining relationships between each modal window generated, or controlling refresh and update of contents of each modal window generated. The client device can receive the at least one user interface page from the web server and render the at least one user interface page. Rendering the at least one user interface page can include invoking at least one function of the modal controller through the API of the modal controller.

The web server can further assign to each element of the generated user interface page a pair of tags. The pair of tags can comprise a unique identifier for a container of information content for the element. In such cases, the modal controller can refresh contents of one or more modal windows based on the tags. For example, the modal controller can refresh only the information content of an identified container of one or more modal windows based on the tags and without affecting the position of layout of the modal window or content of other elements.

In one implementation, the web server can further dynamically generate a unique Uniform Resource Locator (URL) for a modal window of the user interface. The unique URL can comprise a unique Uniform Resource Identifier (URI) indicating a sequential window count for the modal window. The web server can maintain a linked list of unique URLs for modal windows of each of one or more browser sessions of the client. In some cases, each entry of each linked list is associated with one or more timestamps. In such cases, the web server can expire a link list based on the associated timestamps. Additionally or alternatively, the web server and/or the application server can track a state of a modal window and application data associated therewith based on the unique URL and the tags identifying each element.

According to another embodiment, a method for managing an interface of an enterprise application can comprise executing, by one or more servers, an enterprise application. Executing the enterprise application can comprise maintaining and providing a set of application data. At least one user interface page can be generated by the one or more servers based on the application data. The one or more servers can provide the at least one user interface page to a client device executing a client application. The client application can comprise a modal controller separate from a browser application of the client device and having an Application Program Interface (API) for invoking one or more functions of the modal controller. The functions of the modal controller can include, but are not limited to, one or more of generating one or more modal windows, assigning an identifier to each modal window generated, maintaining relationships between each modal window generated, or controlling refresh and update of contents of each modal window generated. A pair of tags can be assigned to each element of the generated user interface page. The pair of tags can comprise a unique identifier for a container of information content for the element.

A unique Uniform Resource Locator (URL) for a modal window of the user interface can be dynamically generated by the one or more servers. The unique URL can comprise a unique Uniform Resource Identifier (URI) indicating a sequential window count for the modal window. The one or more servers can maintain a linked list of unique URLs for modal windows of each of one or more browser sessions of the client. Each entry of each linked list can be associated with one or more timestamps. In such cases, the one or more servers can expire a link list based on the associated timestamps. Additionally or alternatively, the one or more servers can track a state of a modal window of the client application and application data associated therewith based on the unique URL and the tags identifying each element.

According to yet another embodiment, a method for managing an interface of an enterprise application can comprise receiving, by a client device executing a modal controller separate from a browser application of the client device, at least one user interface page of an enterprise application from a web server through an Application Program Interface (API) for invoking one or more functions of the modal controller. For example, the functions of the modal controller can include, but are not limited to, one or more of generating one or more modal windows, assigning an identifier to each modal window generated, maintaining relationships between each modal window generated, or controlling refresh and update of contents of each modal window generated. The at least one user interface page can be rendered by the client device. Rendering the at least one user interface page can include invoking at least one function of the modal controller through the API of the modal controller.

In some cases, each element of the user interface page can comprise a pair of tags. The pair of tags can comprise a unique identifier for a container of information content for the element. In such cases, contents of one or more modal windows can be refreshed by the modal controller based on the tags. For example, the modal controller can refresh only the information content of an identified container of one or more modal windows based on the tags and without affecting the position of layout of the modal window or content of other elements.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for managing an interface of an enterprise application to support unlimited modal and modeless elements thereof. More specifically, embodiments of the present invention can include an Application Program Interface (API) for invoking and interacting with a set of modal and/or modeless functions and which can be browser independent. Such an API can be implemented, for example, in JavaScript or other language supported by the browser. Generally speaking, this script or application can provide features such as normally associated with the browser's modal support but without relying on that support and without many of the constraints and other limitations normally imposed or encountered with the browser's modal support.

In order effectively support multi-level stackable modals and maintain parent-child relationships between each level of modal windows, embodiments of the present invention also provide Asynchronous JavaScript and XML (AJAX) support for enterprise applications. Embodiments of the present invention provide complete or more complete support of AJAX from search to component, from page tab to page tab within a component, from attachment window to parent window, etc. For example, an AJAX enabled enterprise application can preserve page layout generation and with no application up take effort. To do so, embodiments of the present invention provide a container and html element content paring concept. Embodiments add an invisible div container to controls with a unique id which won't affect the page layout generation while refreshing the content in the container. Embodiments also provide a set of xml tags for partial page refresh and script execution.

Embodiments can also include a protocol to communicate between the browser and servers for window opening, closing, and transitioning. As will be seen, this protocol, can reduce the number of server trips to support modal windows for better performance and addresses other problems often associated with modal support. This protocol can include a dynamic URI which is dynamically appended to the URL string and used by the web server to control the sequence number of the modal windows. Generally speaking, the web server can maintain multiple linked lists for each browser window per user and identified by the sequence number. Each linked list can have a creation time and last access time. Embodiments can include logic on the web server to automatically go through the lists and expire them based the time stamps. This can stabilize the server memory usage while allowing for tracking of each browser session for a user. With the dynamic URI in place, it becomes possible to allow the user to update the parent window and modeless window at the same time with any data entry lost.

Accordingly, implementations of modal windows can be constructed in which auto resizing of the modal window can be done based on the content, the modal window can span beyond the boundary of the parent frame that launched the window, and/or unlimited stackable modal windows can be opened in one browser session. With AJAX support, a sophisticated modal controller can be created to manage parent-child relationships between modal windows for communication, opening and closing and insure proper state management for complex business logic. Additionally or alternatively, modal support can be expanded to other tools and/or controls such as spell check, grid customization, popup menus and notification, pagelets, etc. In some implementations, embodiments of the present invention can additionally or alternatively provide modeless window support which can allow a user to work on more than one page at a time within one browser session. Various additional details of embodiments of the present invention will be described below with reference to the figures.

Figure 1:
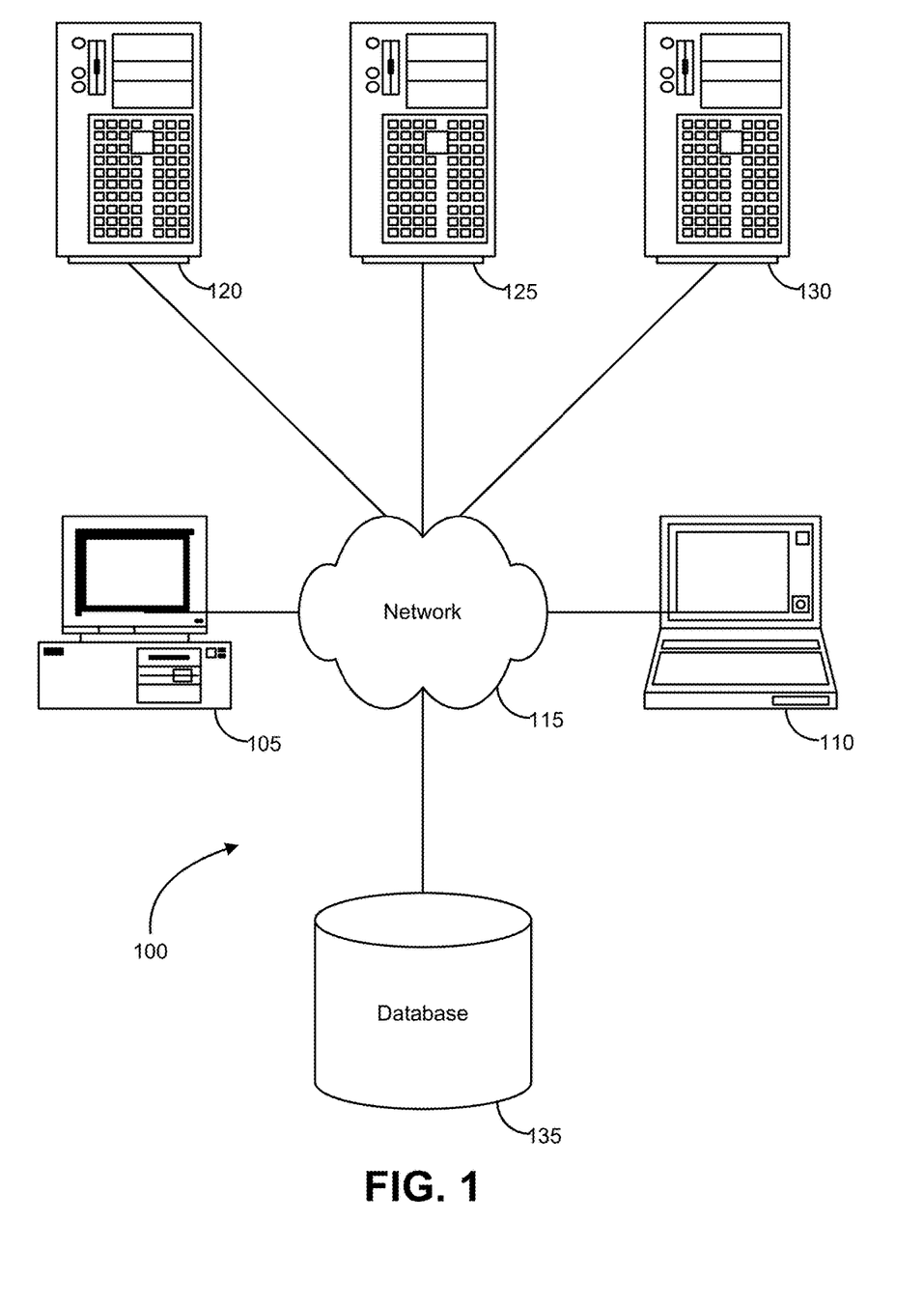
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
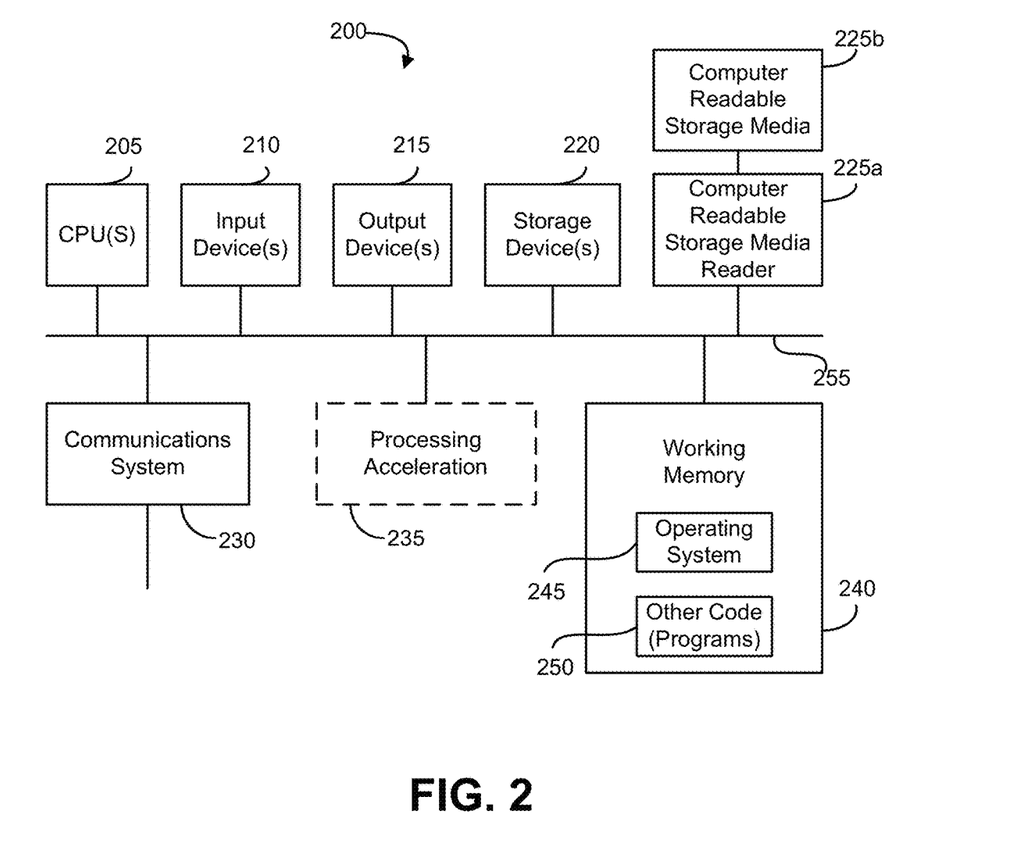
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 and/or any other computer described above with respect to the system 100.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
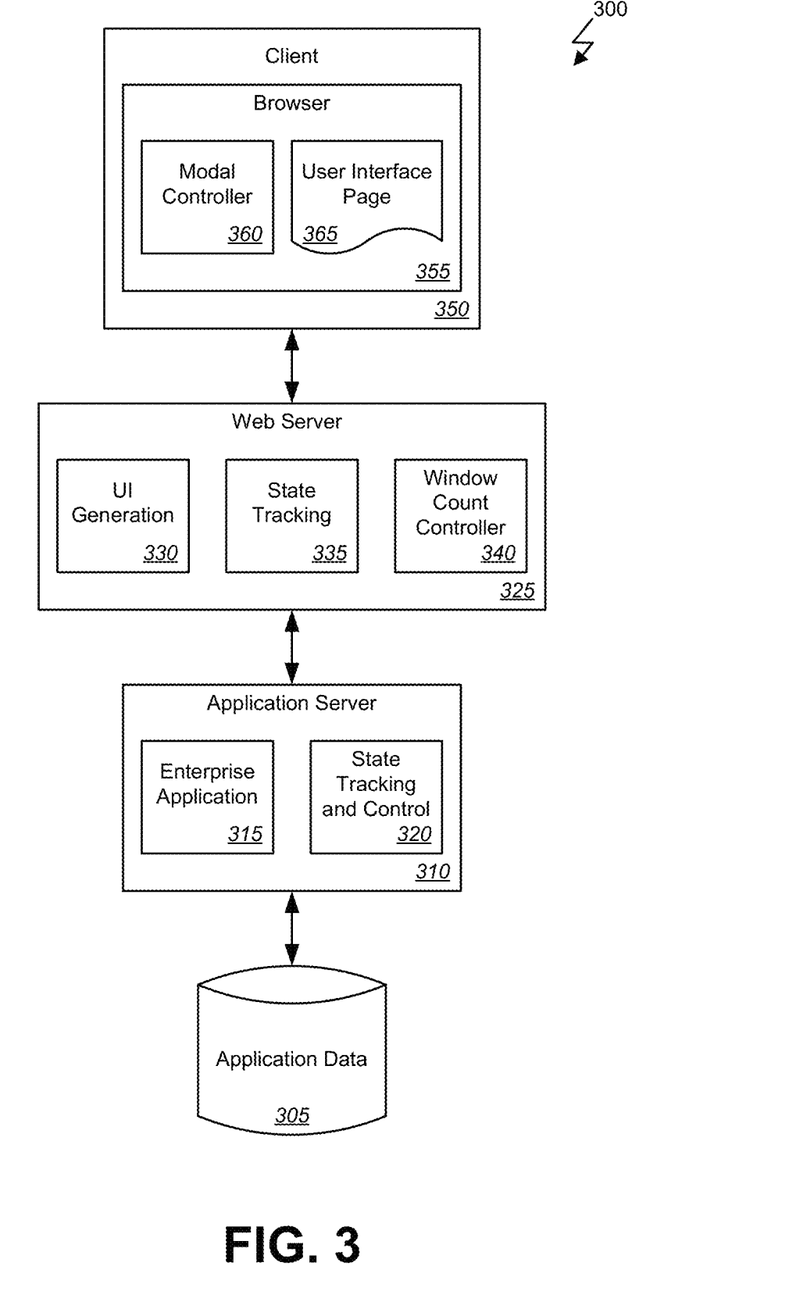
FIG. 3 is a block diagram illustrating, at a high-level, functional components of a system for managing a user interface of an enterprise application according to one embodiment of the present invention.

FIG. 3 is a block diagram illustrating, at a high-level, functional components of a system for managing a user interface of an enterprise application according to one embodiment of the present invention. In this example, the system 300 can include an application server 310 such as any of the computer systems described above. The application server 310 can execute an enterprise application 315 comprising any of a variety of different applications including but not limited to a Customer Relationship Management (CRM) application, a financials application, a project management application, a supply chain management application, etc. Embodiments of the present invention can be directed to various enhancements of tools for an enterprise application. One example of such tools for an enterprise application is Oracle PeopleSoft Enterprise Tools. However, while described herein with reference to these tools by way of example and for illustrative purposes, embodiments of the present invention should not be considered limited to implementation with this or any other particular enterprise application. Rather, embodiments of the present invention are thought to be equally applicable to a variety of different applications.

Regardless of the type or nature of the application 315, the application 315 can maintain a set of application data in a database 305 or other repository coupled with and accessible by the application server 310. The application data can include any of the different types of data used by the application including but not limited to financial records, personnel records, product information, project schedules, customer records, etc.

The system 300 can also include a web server 325 such as any of the computer systems described above communicatively coupled with the application server 310 via a local area or wide area network also as described above. The system 300 can also include a client device 350 such as any of the computers or devices described above and similarly coupled with the web server 325 via a local or wide area network also as described above. Generally speaking, the application server 310 can provide application data from the repository 305 to the web server 325. The web server 325 can in turn, for example through a user interface generation module 330, package and provide the application data to the client device 350. For example, the user interface generation module 330 of the web server 325 may generate a HyperText Markup Language (HTML) web page using the application data from the application server 310 and can send this web page to the client device 350.

The client device 350 can in turn receive the web page or other interface data from the web server 325 and render or display it in the interface page 365, for example through a browser 355 or other application executing on the client device 350. In some cases, the interface may include one or more modal windows. For example, a modal window, i.e. a child window of the user interface page 365, may be opened, for example in response to a click of an element or other action related to the parent window of the user interface page 365. The user may then interact with this modal window to enter some data or takes some other action before returning to the parent page or window.

Embodiments of the invention provide systems and methods for managing an interface of an enterprise application to support unlimited modal and modeless elements thereof but without using modal functions or APIs of the browser. Rather, a modal controller 360 can be executed by the client device 350 to manage modal windows on the page. Generally speaking, the modal controller 360 can assign numbers or other identifiers for the modal windows, maintain relationships between the windows, control refresh and update of the information of the modal windows, etc.

More specifically, embodiments of the present invention can include an Application Program Interface (API) for invoking and interacting with a set of modal and/or modeless functions and which can be browser independent. Such an API can be implemented as a modal controller 360, for example, in JavaScript or other language supported by the browser 355. This script or application can provide features such as normally associated with the browser's 355 modal support but without relying on that support and without many of the constraints and other limitations normally imposed or encountered with the browser's 355 modal support.

According to an embodiment of the present invention, the modal controller 360 can provide a set of APIs in JavaScript that are browser independent and with features that existing browser modal support does not provide. For example, embodiments support multi-level stackable modals and can maintain parent-child relationship between each level of modal windows. These embodiments provide features including but not limited to providing auto resize of modal window based on the content, allowing modal windows to span beyond the boundary of the parent frame that launched the window, and supporting unlimited stackable modal windows in one browser session. Additionally or alternatively, the modal controller 360 can manage modal windows' parent-child relationships for communication, opening and closing and can provide proper state management for complex business logic of the enterprise application 315 but with little or no application up take effort.

In order effectively support multi-level stackable modals and maintain parent-child relationships between each level of modal windows, embodiments of the present invention also provide Asynchronous JavaScript and XML (AJAX) support for enterprise application 315. Embodiments of the present invention provide complete or more complete support of AJAX from search to component, from page tab to page tab within a component, from attachment window to parent window, etc. of the user interface page 365. For example, an AJAX enabled enterprise application 315 can preserve page layout generation and with no application up take effort. To do so, embodiments of the present invention provide a container and html element content paring concept. Embodiments add an invisible div container to controls of the user interface page 365 with a unique id which won't affect the page layout generation while refreshing the content in the container. Embodiments also provide a set of xml tags for partial page refresh and script execution.

Such AJAX support allows for supporting page refresh of the user interface page 365 and without affecting page definitions, e.g., positioning, sizing, etc., that are defined in metadata for the application 315. To do so, elements in a window (i.e., each element, group, box, page, etc.) can be defined by the user interface generation module 330 of the web server 325 as a container using a pair of tags. Then, when the modal controller 360 refreshes the user interface page 365, the modal controller 360 can refresh just the content of a particular container(s) without impacting the positioning etc. That is, each element (page, tab, component, etc.) of the user interface page 365 can be defined as a separate component and refreshed individually (i.e., a partial page refresh). So for example, selecting a new tab in the user interface page 365 can cause the modal controller 360 to refresh the group but not the whole page. Logic of the modal controller 360 can also locate and refresh the child and/or other related containers for the updated component/container. Additionally or alternatively, the changes can be sent by the modal controller 360 to the web server 325 and application server 310.

As noted, embodiments of the present invention provide a container and html element content paring concept. Embodiments add an invisible div container to controls with a unique id which won't affect the page layout generation while refreshing the content in the container. Embodiments also provide a set of xml tags for partial page refresh and script execution. These tags can include but are not limited to:

<FIELD> . . . </FIELD> can be used to store the html elements that need to be refreshed;

<GENSCRIPT> . . . </GENSCRIPT> can be used to store the javascript that need to be executed after the partial page refreshed;

GENMSG> . . . </GENMSG> can be used to store the messages that should be displayed in modal dialog; and <GENJS> . . . </GENJS> and <GENCSS> . . . </GENCSS> can be used for external JavaScript and style sheets to be added to the page header.

Currently AJAX doesn't support multi-part form that would support attachment from modal windows. Embodiments of the present invention provide a two steps process AJAX for multi-part form which is to submit the request with the traditional form submit, hide attachment modal while following with a second request from the parent window to the web server re-fetch the partial page response.

Embodiments also provide a protocol via an http header to communicate between the browser 355 and servers 325 and 310 for window opening, closing, and transitioning. This protocol, can reduce the number of server trips to support modal windows for better performance and addresses other problems often associated with modal support. This protocol can include a dynamic Uniform Resource Identifier (URI) which is dynamically appended to the Uniform Resource Locator (URL) string and used, for example by the window count controller 340 of the web server 325, to control the sequence number of the modal windows.

Generally speaking, the window count controller 340 of the web server 325 can maintain multiple linked lists for each browser window per user and identified by the sequence number. Each linked list can have a creation time and last access time. Embodiments can include logic of the window count controller 340 of the web server 325 to automatically go through the lists and expire them based the time stamps. This can stabilize the server memory usage while allowing for tracking of each browser session for a user. With the dynamic URI in place, it becomes possible to allow the user to update the parent window and modeless window at the same time with any data entry lost. A typical URL includes a protocol identifier, a URI, and a query string. Usually the query string is modified to identify a modal window or component thereof but here this won't work because if user moves away to an unrelated page, the URI changes. So, the protocol of the present invention modifies the URI to include a window count in the URI. Additionally, a state tracking module 335 of the web server 325 and a state tracking and control module 320 of the application server 310 can track state information based on the window count identifier According to yet another embodiment of the present invention, sticky state management for modeless windows is also provided. Support of modeless windows is a feature to allow a user to perform updates from the parent, modal window as well as a modeless window at the same time from the same browser session. To support this feature, each window can maintain its own state. For each page, there can be a status block number and a state number assigned by the state tracking module 335 of the web server 325. The state number can have an associated binary blob stored on the web server 335 for that page. The status block number can have an associated link list stored by the state tracking module 335 on the web server 325 to track each page blob in the order that user actions are performed from that browser session.

Following are described some examples of user interfaces which may be presented through various implementations of one or more embodiments of the present invention. It should be understood that these examples are provided only to illustrate the features of these embodiments and implementations. Furthermore, it should be understood that these examples should not be considered to place limitations on the scope of the present invention. Rather, they are presented for illustrative purposes only to provide a more complete understanding of the various embodiments. Any of a number of variations in format and/or content can be made to these interfaces without departing from the scope of the present invention.

Figure 4:
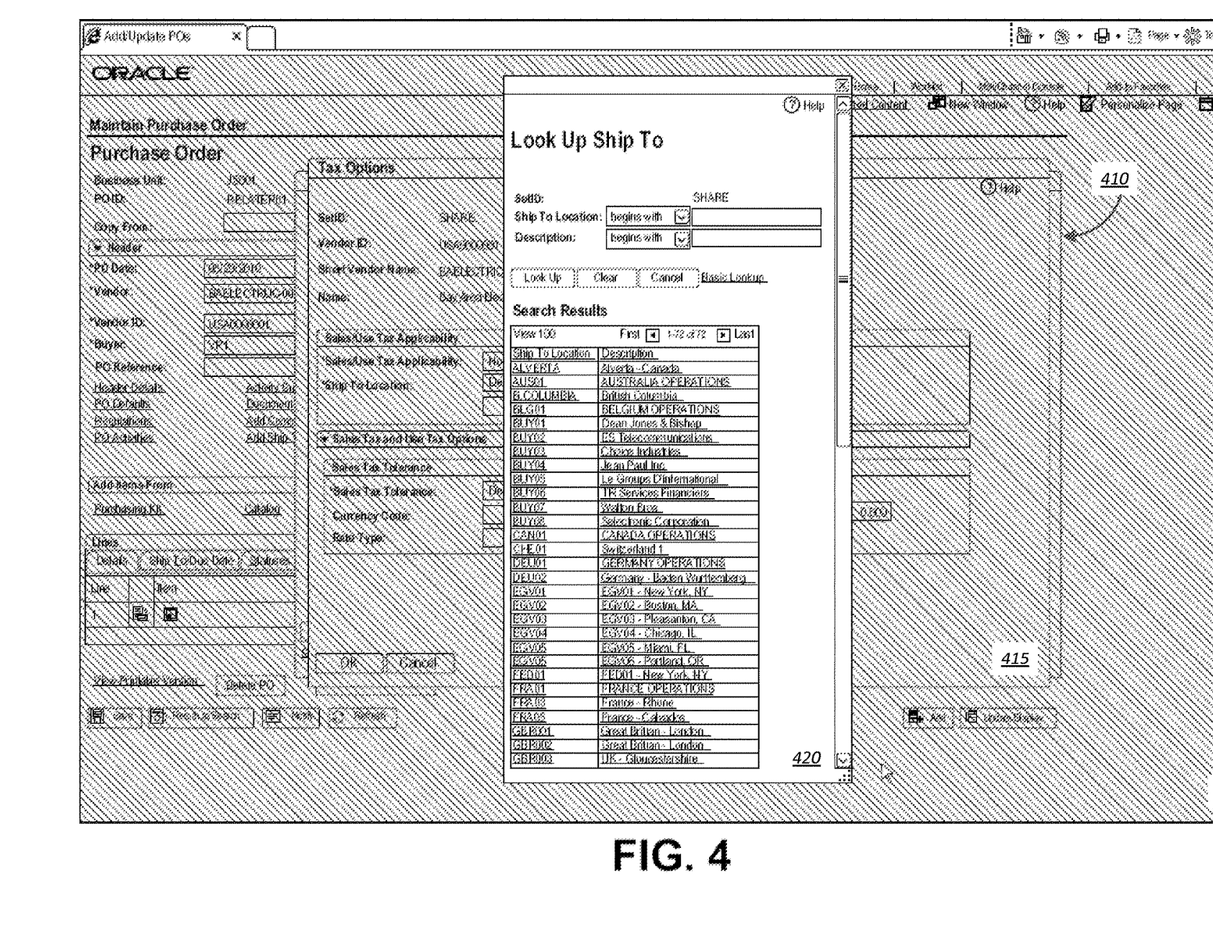
FIG. 4 is a screenshot illustrating an example of stackable modals in a user interface for an enterprise application according to one embodiment of the present invention.

FIG. 4 is a screenshot illustrating an example of stackable modals in a user interface for an enterprise application according to one embodiment of the present invention. In this example, the interface includes a main page 405 and a number of stackable modal windows 410, 415 and 420. The main page 405 and these modal windows 410, 415 and 420 can have a parent-child relationship. For example, modal window 410 may be a child of the main page 405, modal window 415 may be a child window of modal window 410, and modal window 420 may in turn be a child window of modal window 420. Since these windows 405-420 are modal, the user interacts with each, in turn, based on a reverse order of these parent-child relationships, i.e., interacts with child window 420 before returning to its parent window 415, etc. As described above, changes to one of these windows, for example modal window 420, may be propagated back to the other windows 405, 410, and 415 based on these relationships.

Figure 5:
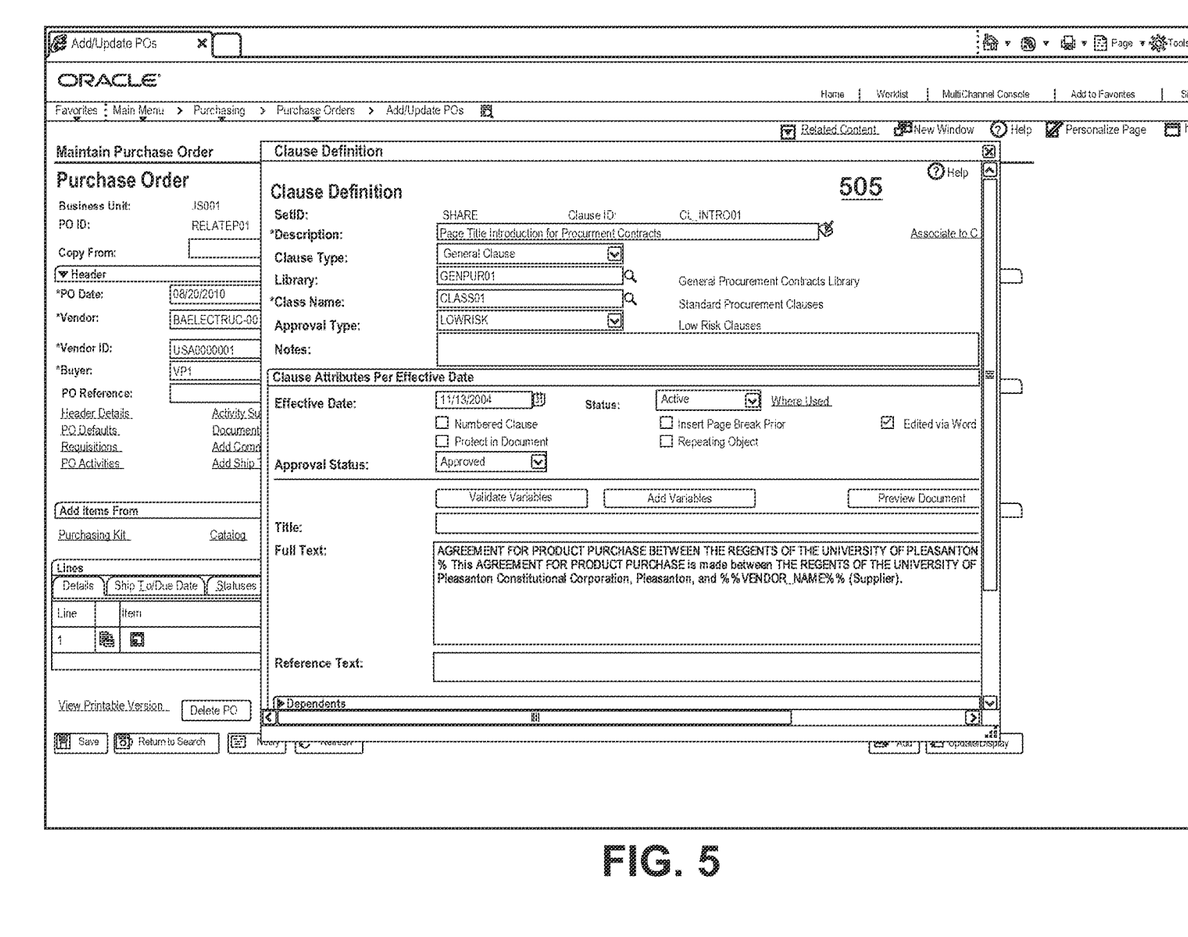
FIG. 5 is a screenshot illustrating an example of a modeless window with an independent state signature according to one embodiment of the present invention.

FIG. 5 is a screenshot illustrating an example of a modeless window with an independent state signature according to one embodiment of the present invention. In this example, the interface includes the same main page 405 and a modeless window 505. The main page 405 and the modeless window 505 can have a parent-child relationship. For example, modeless window 505 may be a child of the main page 405. Since the window 505 is modeless, the user need not interact with it before returning to its parent window 405. However, as described above, changes to one of the modeless window 505 can be propagated back to the main page 405. Additionally, it should be understood that while not shown here for the sake of simplicity, more than one modeless window may be opened at any given time. Additionally or alternatively, any number of modal windows as described above and any number of modeless windows with any combination of parent-child relationships may be opened and used at any given time depending upon the implementation.

Figure 6:
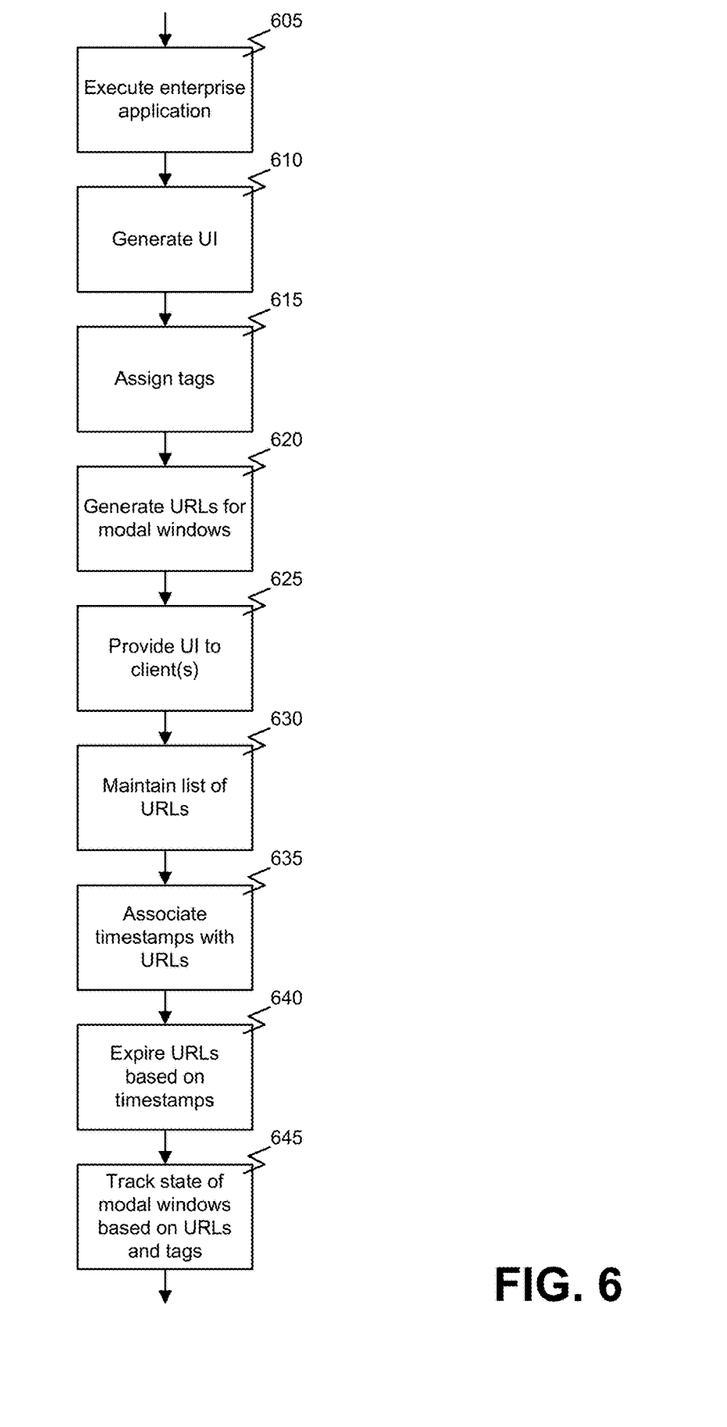
FIG. 6 is a flowchart illustrating exemplary processes for managing a user interface of an enterprise application according to one embodiment of the present invention.

FIG. 6 is a flowchart illustrating exemplary processes for managing a user interface of an enterprise application according to one embodiment of the present invention. For example, this example illustrates processes as may be performed by one or both of the application server and/or the web server as described above. As illustrated here, managing an interface of an enterprise application can comprise executing 605, by one or more servers, an enterprise application. Executing 605 the enterprise application can comprise maintaining and providing a set of application data. At least one user interface page can be generated 610 by the one or more servers based on the application data. The one or more servers can provide 625 the at least one user interface page to a client device executing a client application. The client application can comprise a modal controller separate from a browser application of the client device and having an Application Program Interface (API) for invoking one or more functions of the modal controller. The functions of the modal controller can include, but are not limited to, one or more of generating one or more modal windows, assigning an identifier to each modal window generated, maintaining relationships between each modal window generated, or controlling refresh and update of contents of each modal window generated. During generation 610 of the user interface page, a pair of tags can be assigned 615 to each element of the generated user interface page. The pair of tags can comprise a unique identifier for a container of information content for the element.

A unique Uniform Resource Locator (URL) for a modal window of the user interface can also be dynamically generated 620 by the one or more servers. The unique URL can comprise a unique Uniform Resource Identifier (URI) indicating a sequential window count for the modal window. The one or more servers can maintain 630 a linked list of unique URLs for modal windows of each of one or more browser sessions of the client. Each entry of each linked list can be associated 635 with one or more timestamps. In such cases, the one or more servers can expire 640 a link list based on the associated timestamps. Additionally or alternatively, the one or more servers can track 645 a state of a modal window of the client application and application data associated therewith based on the unique URL and the tags identifying each element.

Figure 7:
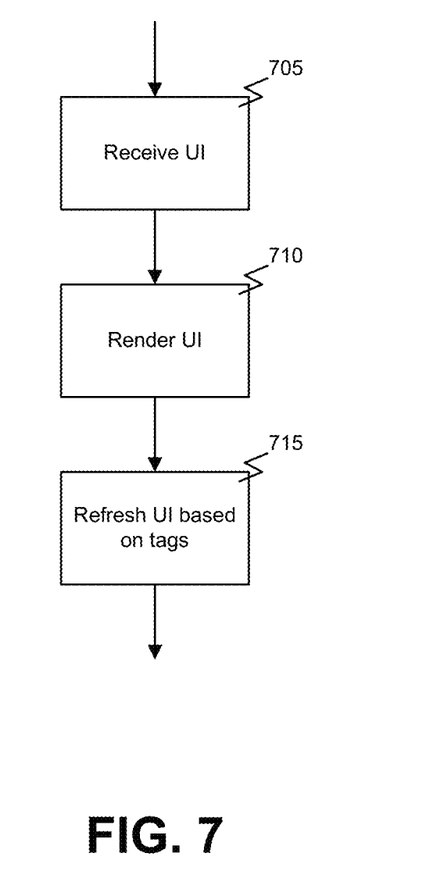
FIG. 7 is a flowchart illustrating exemplary processes for managing a user interface of an enterprise application according to another embodiment of the present invention.

FIG. 7 is a flowchart illustrating exemplary processes for managing a user interface of an enterprise application according to another embodiment of the present invention. For example, this example illustrates processes as may be performed by the client device as described above. As illustrated here, a method for managing an interface of an enterprise application can comprise receiving 705, by a client device executing a modal controller separate from a browser application of the client device, at least one user interface page of an enterprise application from a web server through an Application Program Interface (API) for invoking one or more functions of the modal controller. For example, the functions of the modal controller can include, but are not limited to, one or more of generating one or more modal windows, assigning an identifier to each modal window generated, maintaining relationships between each modal window generated, or controlling refresh and update of contents of each modal window generated. The at least one user interface page can be rendered 710 by the client device. Rendering 710 the at least one user interface page can include invoking at least one function of the modal controller through the API of the modal controller.

In some cases, each element of the user interface page can comprise a pair of tags. The pair of tags can comprise a unique identifier for a container of information content for the element. In such cases, contents of one or more modal windows can be refreshed 715 by the modal controller based on the tags. For example, the modal controller can refresh only the information content of an identified container of one or more modal windows based on the tags and without affecting the position of layout of the modal window or content of other elements.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system comprising:
   a server system comprising an application server communicatively coupled with a web server, wherein:
   the application server comprises a first processor and a first memory;
   the web server comprises a second processor and a second memory;
   the application server, using the first processor, executes an application to retrieve a set of application data from a data repository and transfer the set of application data to the web server;
   the web server, using the second processor, generates at least one user interface page based on the set of application data, and transmits the at least one user interface page to a client device via a network; and
   the server system, using the second processor, defines window elements for one or more modal windows corresponding to the at least one user interface page, wherein:
   the defining the window elements comprises defining a respective container for each window element of the window elements, and
   the one or more modal windows comprise a first modal window that is related to the at least one user interface page with a first parent-child relationship, so that i) the first modal window is related as a child of the at least one user interface page, ii) the first modal window is presented in front of the at least one user interface page, and iii) workflow is controlled so that user interaction with the first modal window occurs before the workflow is controlled to return to the at least one user interface page;
   the server system stores, in one or both of the first memory and the second memory, count identifiers of the one or more modal windows; and
   the client device is communicatively coupled with the web server and executing i) a browser application to render the at least one user interface page and ii) a modal controller application separate from the browser application, the modal controller application providing:
   modal control functions including generating the first modal window, assigning a count identifier to the first modal window, generating a second modal window, and maintaining a relationship between the first modal window and the second modal window; and
   an application program interface to the modal control functions, the client device receiving the at least one user interface page from the web server and performing the modal control functions of the modal controller application, the modal control functions invoked through the application program interface to the modal control functions of the first modal window which corresponds to a first container, wherein the application program interface is implemented with a script.

2. The system of claim 1, wherein:
   the one or more modal windows comprise the second modal window, and the relationship between the first modal window and the second modal window corresponds to a second parent-child relationship, so that i) the second modal window is related as a child of the first modal window, ii) the second modal window is presented in front of the first modal window, and iii) workflow is controlled so that user interaction with the second modal window occurs before the workflow is controlled to return to the first modal window; and
   the modal control functions further include one or more of generating the second modal window, assigning a second identifier to the second modal window, maintaining relationships between the second modal window and the first modal window, or controlling refresh of contents of a second container of the second modal window.

3. The system of claim 1, wherein the web server further assigns to each element of the at least one user interface page a pair of tags, the pair of tags together comprising a unique identifier for a respective container of information content for the element.

4. The system of claim 3, wherein the modal controller application refreshes contents of the one or more modal windows based on the tags.

5. The system of claim 4, wherein the modal controller application refreshes only the information content of an identified container of at least one modal window of the one or more modal windows based on the tags and without affecting a position of layout of the at least one modal window or content of other elements.

6. The system of claim 3, wherein the web server further dynamically generates a unique uniform resource locator for the first modal window, the unique uniform resource locator comprising a unique uniform resource identifier indicating a sequential window count for the first modal window.

7. The system of claim 6, wherein the web server maintains a linked list, the linked list listing unique uniform resource locators for modal windows of each of one or more browser sessions of the client device.

8. The system of claim 7, wherein each entry of the linked list is associated with one or more timestamps, and wherein the web server expires the linked list based on at least one of the one or more timestamps.

9. The system of claim 7, wherein the web server and the application server each track states of the one or more modal windows and application data associated therewith based on the unique uniform resource locator and the tags identifying each element.

10. A method for managing an interface of an application, the method comprising:
   executing, by an application server of a server system using a first processor, an application to retrieve a set of application data from a data repository and transfer the set of application data to a web server of the server system that is communicatively coupled with the application server, where:
      the application server comprises the first processor and a first memory; and
      the web server comprises a second processor and a second memory;
   generating, by the web server using the second processor, at least one user interface page based on the set of application data, and transmitting the at least one user interface page to a client device via a network;
   defining window elements, by the server system using the second processor, for one or more modal windows corresponding to the at least one user interface page, wherein the defining the window elements comprises defining a respective container for each window element of the window elements, and
   the one or more modal windows comprise a first modal window that is related to the at least one user interface page with a first parent-child relationship, so that i) the first modal window is related as a child of the at least one user interface page, ii) the first modal window is presented in front of the at least one user interface page, and iii) workflow is controlled so that user interaction with the first modal window occurs before the workflow is controlled to return to the at least one user interface page; and
   storing, in one or both of the first memory and the second memory, count identifiers of the one or more modal windows;
   wherein the client device is communicatively coupled with the web server and executes i) a browser application to render the at least one user interface page and ii) a modal controller application separate from the browser application, the modal controller application providing:
      modal control functions including generating the first modal window, assigning a count identifier to the first modal window, generating a second modal window, and maintaining a relationship between the first modal window and the second modal window; and
      an application program interface to the modal control functions, the client device receiving the at least one user interface page from the web server and performing the modal control functions of the modal controller application, the modal control functions invoked through the application program interface to the modal control functions of the first modal window which corresponds to a first container, wherein the application program interface is implemented with a script.

11. The method of claim 10, wherein:
   the one or more modal windows comprise the second modal window, and the relationship between the first modal window and the second modal window corresponds to a second parent-child relationship, so that i) the second modal window is related as a child of the first modal window, ii) the second modal window is presented in front of the first modal window, and iii) workflow is controlled so that user interaction with the second modal window occurs before the workflow is controlled to return to the first modal window; and
   the modal control functions further include one or more of generating second modal window, assigning a second identifier to the second modal window, maintaining relationships between the second modal window and the first modal window, or controlling refresh of contents of a second container of the second modal window.

12. The method of claim 10, further comprising assigning to each element of the at least one user interface page a pair of tags, the pair of tags together comprising a unique identifier for a respective container of information content for the element.

13. The method of claim 12, further comprising dynamically generating, by the one or more servers, a unique uniform resource locator for the first modal window, the unique uniform resource locator comprising a unique uniform resource identifier indicating a sequential window count for the first modal window.

14. The method of claim 13, further comprising maintaining, by the one or more servers, a linked list, the linked list listing unique uniform resource locators for modal windows of each of one or more browser sessions of the client device.

15. The method of claim 14, wherein each entry of the linked list is associated with one or more timestamps, and wherein the one or more servers expire the linked list based on at least one of the one or more timestamps.

16. The method of claim 14, further comprising tracking, by the one or more servers, states of the one or more modal windows and application data associated therewith based on the unique uniform resource locator and the tags identifying each element.

17. A method for managing an interface of an application, the method comprising:
   receiving, by a client device comprising a first processor and a first memory, at least one user interface page of an application from a web server of a server system, wherein:
      the client device is communicatively coupled with the web server;
      the server system comprises the web server communicatively coupled with an application server;
      the application server comprises a second processor and a second memory, and uses the second processor to execute an application to retrieve a set of application data from a data repository and transfer the set of application data to the web server; and
      the web server comprises a third processor and a third memory, and uses the third processor to generate the at least one user interface page based on the set of application data, and transmits the at least one user interface page to the client device via a network;

executing, by the client device using the first processor, a browser application and a modal controller application separate from the browser application, the modal controller application providing:
    modal control functions including generating a first modal window, assigning a count identifier to the first modal window, generating a second modal window, and maintaining a relationship between the first modal window and the second modal window; and
    an application program interface to the modal control functions;
rendering, by the client device using the browser application, the at least one user interface page through the browser application and one or more modal windows corresponding to the at least one user interface page, wherein:
    window elements for the one or more modal windows are defined by the server system, using the third processor, at least partially by defining a respective container for each window element of the window elements;
    the server system stores, in one or both of the second memory and the third memory, count identifiers of the one or more modal windows; and
    the one or more modal windows comprise the first modal window that is related to the at least one user interface page with a first parent-child relationship, so that i) the first modal window is related as a child of the at least one user interface page, ii) the first modal window is presented in front of the at least one user interface page, and iii) workflow is controlled so that user interaction with the first modal window occurs before the workflow is controlled to return to the at least one user interface page; and
performing, by the client device using the first processor, the modal control functions of the modal controller application, the modal control functions invoked through the application program interface to the modal control functions of the first modal window which corresponds to a first container, wherein the application program interface is implemented with a script.

18. The method of claim 17, wherein each element of the at least one user interface page comprises a pair of tags, the pair of tags together comprising a unique identifier for a respective container of information content for the element.

19. The method of claim 18, further comprising refreshing contents of the one or more modal windows, by the modal controller application, based on the tags.

20. The method of claim 19, wherein the modal controller application refreshes only the information content of an identified container of at least one modal window of the one or more modal windows based on the tags and without affecting a position of layout of the at least one modal window or content of other elements.

21. One or more non-transitory, computer-readable media having computer-readable instructions thereon, which computer-readable instructions, when executed by a server system, cause the server system to perform actions comprising:
    executing, by an application server of the server system using a first processor, an application to retrieve a set of application data from a data repository and transfer the set of application data to a web server of the server system that is communicatively coupled with the application server, where:
        the application server comprises the first processor and a first memory; and
        the web server comprises a second processor and a second memory;
    generating, by the web server using the second processor, at least one user interface page based on the set of application data, and transmitting the at least one user interface page to a client device via a network;
    defining window elements, by the server system using the second processor, for one or more modal windows corresponding to the at least one user interface page, wherein:
        the defining the window elements comprises defining a respective container for each window element of the window elements, and the one or more modal windows comprise a first modal window that is related to the at least one user interface page with a first parent-child relationship, so that i) the first modal window is related as a child of the at least one user interface page, ii) the first modal window is presented in front of the at least one user interface page, and iii) workflow is controlled so that user interaction with the first modal window occurs before the workflow is controlled to return to the at least one user interface page; and storing, in one or both of the first memory and the second memory, count identifiers of the one or more modal windows;
    wherein the client device is communicatively coupled with the web server and executes i) a browser application to render the at least one user interface page and ii) a modal controller application separate from the browser application, the modal controller application providing:
        modal control functions including generating the first modal window, assigning a count identifier to the first modal window, generating a second modal window, and maintaining a relationship between the first modal window and the second modal window; and
        an application program interface to the modal control functions, the client device receiving the at least one user interface page from the web server and performing the modal control functions of the modal controller application, the modal control functions invoked through the application program interface to the modal control functions of the first modal window which corresponds to a first container, wherein the application program interface is implemented with a script.

22. The one or more non-transitory, computer-readable media of claim 21, wherein:
    the one or more modal windows comprise the second modal window, and the relationship between the first modal window and the second modal window corresponds to a second parent-child relationship, so that i) the second modal window is related as a child of the first modal window, ii) the second modal window is presented in front of the first modal window, and iii) workflow is controlled so that user interaction with the second modal window occurs before the workflow is controlled to return to the first modal window; and
    the modal control functions further include one or more of generating second modal window, assigning a second identifier to the second modal window, maintaining relationships between the second modal window and the first modal window, or controlling refresh of contents of a second container of the second modal window.

23. The one or more non-transitory, computer-readable media of claim 21, the actions further comprising assigning to each element of the at least one user interface page a pair of tags, the pair of tags together comprising a unique identifier for a respective container of information content for the element.

24. The one or more non-transitory, computer-readable media of claim 23, the actions further comprising dynamically generating, by the one or more servers, a unique uniform resource locator for the first modal window, the unique uniform resource locator comprising a unique uniform resource identifier indicating a sequential window count for the first modal window.

25. The one or more non-transitory, computer-readable media of claim 24, the actions further comprising maintaining, by the one or more servers, a linked list, the linked list listing unique uniform resource locators for modal windows of each of one or more browser sessions of the client device.

26. The one or more non-transitory, computer-readable media of claim 25, wherein each entry of the linked list is associated with one or more timestamps, and wherein the one or more servers expire the linked list based on at least one of the one or more timestamps.

27. The one or more non-transitory, computer-readable media of claim 25, the actions further comprising tracking, by the one or more servers, states of the one or more modal windows and application data associated therewith based on the unique uniform resource locator and the tags identifying each element.

28. One or more non-transitory, computer-readable media having computer-readable instructions thereon, which computer-readable instructions, when executed by a client device, cause the client device to perform actions comprising:
  receiving at least one user interface page of an application from a web server of a server system, wherein:
    the client device comprises a first processor and a first memory, and is communicatively coupled with the web server;
    the server system comprises the web server communicatively coupled with an application server;
    the application server comprises a second processor and a second memory, and uses the second processor to execute an application to retrieve a set of application data from a data repository and transfer the set of application data to the web server; and
    the web server comprises a third processor and a third memory, and uses the third processor to generate the at least one user interface page based on the set of application data, and transmits the at least one user interface page to the client device via a network;
  executing, by the client device using the first processor, a browser application and a modal controller application separate from the browser application, the modal controller application providing:
    modal control functions including generating a first modal window, assigning a count identifier to the first modal window, generating a second modal window, and maintaining a relationship between the first modal window and the second modal window; and
    an application program interface to the modal control functions; rendering, by the client device using the browser application, the at least one user interface page through the browser application and one or more modal windows corresponding to the at least one user interface page, wherein:
    window elements for the one or more modal windows are defined by the server system, using the third processor, at least partially by defining a respective container for each window element of the window elements;
    the server system stores, in one or both of the second memory and the third memory, count identifiers of the one or more modal windows; and
    the one or more modal windows comprise the first modal window that is related to the at least one user interface page with a first parent-child relationship, so that i) the first modal window is related as a child of the at least one user interface page, ii) the first modal window is presented in front of the at least one user interface page, and iii) workflow is controlled so that user interaction with the first modal window occurs before the workflow is controlled to return to the at least one user interface page; and
  performing, by the client device using the first processor, the modal control functions of the modal controller application, the modal control functions invoked through the application program interface to the modal control functions of the first modal window which corresponds to a first container, wherein the application program interface is implemented with a script.

29. The one or more non-transitory, computer-readable media of claim 28, wherein each element of the at least one user interface page comprises a pair of tags, the pair of tags together comprising a unique identifier for a respective container of information content for the element.

30. The one or more non-transitory, computer-readable media of claim 29, the actions further comprising refreshing contents of the one or more modal windows, by the modal controller application, based on the tags.

31. The one or more non-transitory, computer-readable media of claim 30, wherein the modal controller application refreshes only the information content of an identified container of at least one modal window of the one or more modal windows based on the tags and without affecting a position of layout of the at least one modal window or content of other elements.

\* \* \* \* \*

UNITED STATES PATENT AND TRADEMARK OFFICE
CERTIFICATE OF CORRECTION

PATENT NO. : 10,210,026 B2
APPLICATION NO. : 13/531692
DATED : February 19, 2019
INVENTOR(S) : Guo-Boynton

Page 1 of 1

It is certified that error appears in the above-identified patent and that said Letters Patent is hereby corrected as shown below:

In the Specification

In Column 11, Line 10, delete "identifier" and insert -- identifier. --, therefor.

Signed and Sealed this
Twenty-eighth Day of January, 2020

Andrei Iancu
*Director of the United States Patent and Trademark Office*